United States Patent
Sugiura et al.

(10) Patent No.: US 9,685,831 B2
(45) Date of Patent: Jun. 20, 2017

(54) ROTATING ELECTRIC MACHINE

(71) Applicant: DENSO CORPORATION, Kariya, Aichi-pref. (JP)

(72) Inventors: Shinsuke Sugiura, Nishio (JP); Yuki Takahashi, Obu (JP)

(73) Assignee: DENSO CORPORATION, Kariya (JP)

(*) Notice: Subject to any disclaimer, the term of this patent is extended or adjusted under 35 U.S.C. 154(b) by 407 days.

(21) Appl. No.: 14/314,532

(22) Filed: Jun. 25, 2014

(65) Prior Publication Data

US 2014/0375154 A1 Dec. 25, 2014

(30) Foreign Application Priority Data

Jun. 25, 2013 (JP) ................................. 2013-132716

(51) Int. Cl.
| | |
|---|---|
| H02K 9/00 | (2006.01) |
| H02K 3/28 | (2006.01) |
| H02K 3/12 | (2006.01) |
| H02K 3/24 | (2006.01) |

(52) U.S. Cl.
CPC ................. *H02K 3/28* (2013.01); *H02K 3/12* (2013.01); *H02K 3/24* (2013.01)

(58) Field of Classification Search
CPC .................................. H02K 3/28; H02K 9/19
USPC ....... 310/183, 184, 198, 201, 206, 207, 208, 310/52, 54, 58, 64
See application file for complete search history.

(56) References Cited

U.S. PATENT DOCUMENTS

| | | | |
|---|---|---|---|
| 2002/0180299 A1 | 12/2002 | Oohashi et al. | |
| 2009/0322167 A1 | 12/2009 | Ishizuka et al. | |
| 2010/0264760 A1* | 10/2010 | Matsui | H02K 9/19 |
| | | | 310/54 |
| 2011/0241472 A1* | 10/2011 | Tanaka | H02K 3/28 |
| | | | 310/208 |

(Continued)

FOREIGN PATENT DOCUMENTS

| | | |
|---|---|---|
| JP | 2002-218689 | 8/2002 |
| JP | 2002-354736 | 12/2002 |

(Continued)

OTHER PUBLICATIONS

Office Action (2 pgs.) dated May 7, 2015 issued in corresponding Japanese Application No. 2013-132716 with an at least partial English-language translation (3 pgs.).

*Primary Examiner* — Hanh Nguyen
(74) *Attorney, Agent, or Firm* — Nixon & Vanderhye P.C.

(57) ABSTRACT

A rotating electric machine includes a rotor and a stator. The stator includes a stator core and a three-phase stator coil comprised of a plurality of star-connected phase windings. The phase windings are partially received in slots of the stator core to form a pair of coil ends which respectively protrude from opposite axial end faces of the stator core. Each of the phase windings is comprised of a plurality of winding segments. The stator coil also has a plurality of intraphase bridging wires electrically connecting the winding segments of the same phase and a plurality of interphase bridging wires electrically connecting neutral point-side ends of the phase windings. All of the intraphase and interphase bridging wires are arranged on one of the coil ends so that at least one of the intraphase bridging wires is in direct contact with at least one of the interphase bridging wires.

6 Claims, 12 Drawing Sheets

(56) References Cited

U.S. PATENT DOCUMENTS

2012/0019081 A1   1/2012   Tamura et al.

FOREIGN PATENT DOCUMENTS

| JP | 2010-011623 | 1/2010 |
| JP | 2012-29355 | 2/2012 |

* cited by examiner

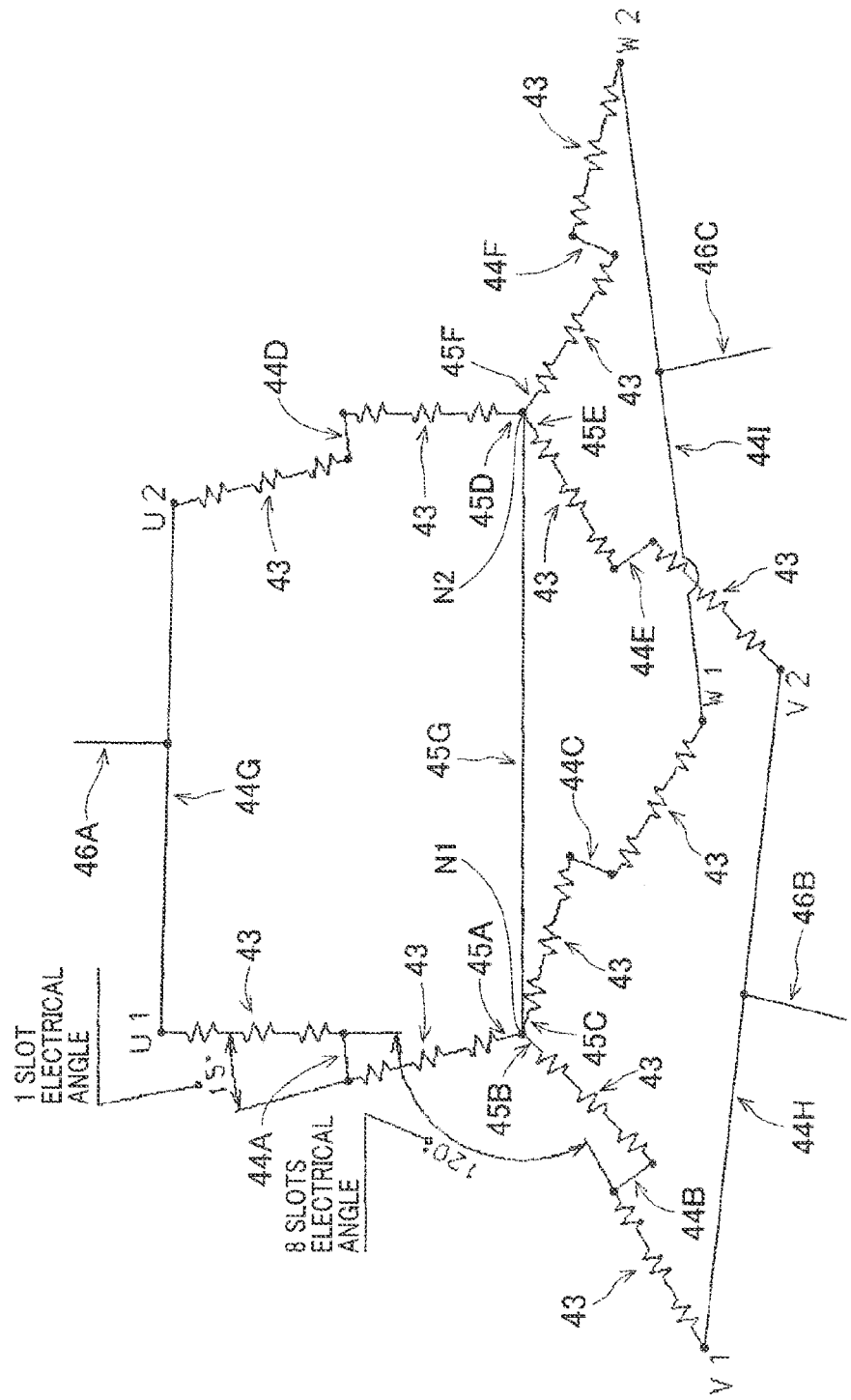

ROTATING ELECTRIC MACHINE

CROSS REFERENCE TO RELATED APPLICATION

This application is based on and claims priority from Japanese Patent Application No. 2013-132716, filed on Jun. 25, 2013, the content of which is hereby incorporated by reference in its entirety into this application.

BACKGROUND

1. Technical Field

The present invention relates to rotating electric machines that are used in, for example, motor vehicles as electric motors and electric generators.

2. Description of Related Art

There are known rotating electric machines which include a rotor and a state. The stator includes an annular stator core and a three-phase stator coil. The stator core is disposed radially outside the rotor so as to surround the rotor. Moreover, the state core has a plurality of slots arranged in its circumferential direction. The state coil is comprised of a plurality of phase windings. The phase windings are mounted on the stator core so as to be partially received in the slots of the stator core. In addition, those parts of the phase windings which are located outside the slots of the stator core together make up a pair of coil ends of the stator coil which respectively protrude from an opposite pair of axial end faces of the stator core.

In operation, electric current flows in the stator coil, causing the stator coil to generate heat. Therefore, to prevent a decrease in efficiency of the rotating electric machine due to the heat generated by the stator coil, it is necessary to suitably cool the stator coil. To this end, cooling air may be supplied to flow through the stator and the rotor. Alternatively, as disclosed in Japanese Patent Application Publication No. JP2010011623A, cooling liquid may be supplied to the coil ends of the stator coil from the upside of the coil ends.

Moreover, the phase windings of the stator coil are generally star-connected to define a neutral point therebetween. Consistently, when electric current flows in the stator coil, it is easiest for the temperature of the stator coil to become high in the vicinity of the neutral point. Accordingly, it is desired to improve the cooling performance of the stator coil in the vicinity of the neutral point.

SUMMARY

According to exemplary embodiments, a rotating electric machine is provided which includes a rotor and a stator. The stator includes an annular stator core and a three-phase stator coil. The stator core is disposed in radial opposition to the rotor and has a plurality of slots arranged in a circumferential direction of the stator core. The stator coil is comprised of a plurality of phase windings star-connected to one another. The phase windings are partially received in the slots of the stator core so that parts of the phase windings are located outside the slots to make up a pair of coil ends of the stator coil. The coil ends protrude respectively from an opposite pair of axial end faces of the stator core. Moreover, each of the phase windings of the stator coil is comprised of a plurality of winding segments. The stator coil further has a plurality of intraphase bridging wires electrically connecting the winding segments of the same phase and a plurality of interphase bridging wires electrically connecting neutral point-side ends of the phase windings. All of the intraphase and interphase bridging wires are arranged on one of the coil ends of the stator coil so that at least one of the intraphase bridging wires is in direct contact with at least one of the interphase bridging wires.

With the above arrangement, it is possible to secure a large heat dissipation area for the interphase bridging wires where it is easiest for the temperature of the stator coil to become high when electric current flows in the stator coil. Consequently it is possible to secure a high cooling performance of the stator coil.

It is preferable that each of the intraphase bridging wires is in either direct or indirect contact with at least one of the interphase bridging wires.

At least one of the intraphase bridging wires may electrically connect a pair of ends of the winding segments of the same phase to each other; one of the pair of ends is led out from a radially outer periphery of the coil end of the stator coil and the other end is led out from a radially inner periphery of the coil end.

The rotating electric machine may further include a cooling liquid supplier that supplies cooling liquid to at least one of the intraphase and interphase bridging wires.

The rotor may have n magnetic poles formed therein and each phase of the stator coil may be made up of p winding segments, where n is an even number greater than or equal to 2 and p is a natural number greater than or equal to 2. When viewed along a longitudinal axis of the stator core, all of the intraphase and interphase bridging wires may be arranged within an angular range θ. It is preferable that θ≥p×360/n[rad].

In the exemplary embodiments, n=8, p=4, and θ≥108°. On the other hand, in modifications of the embodiments, n=12, p=4, and θ≥120°.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings:

FIG. 5 is a schematic circuit diagram of the stator according to the first embodiment;

DESCRIPTION OF EMBODIMENTS

Figure 1:
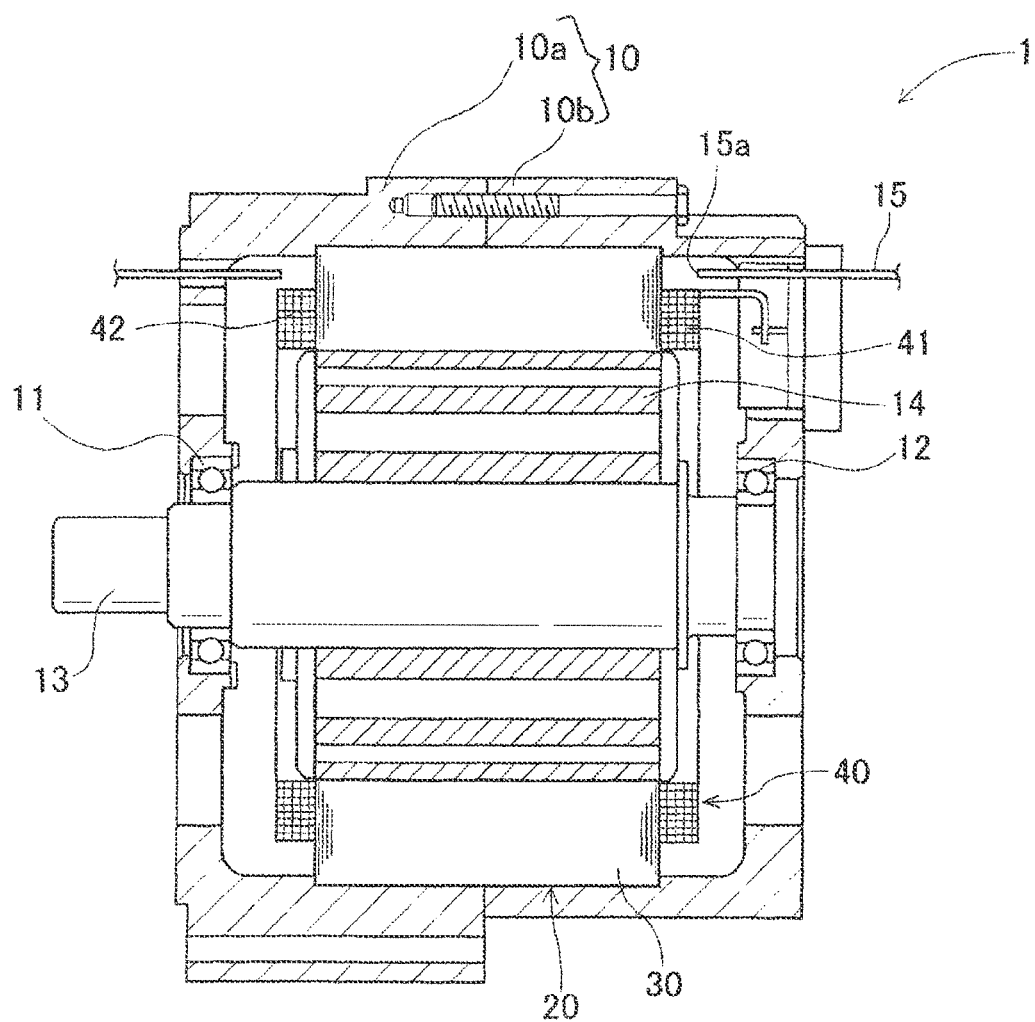
FIG. 1 is a schematic cross-sectional view of a rotating electric machine according to a first embodiment.

Exemplary embodiments and their modifications will be described hereinafter with reference to FIGS. 1-16B. It should be noted that for the sake of clarity and ease of understanding, identical components having identical functions throughout the whole description have been marked, where possible, with the same reference numerals in each of the figures and that for the sake of avoiding redundancy, explanations of the identical components will not be repeated.

First Embodiment

FIG. 1 shows the overall configuration of a rotating electric machine 1 according to a first embodiment.

In the present embodiment, the rotating electric machine 1 is designed to be used in a motor vehicle, such as a passenger car or truck, as an electric motor.

As shown in FIG. 1, the rotating electric machine 1 includes a housing 10, a rotor 14 and a stator 20. The housing 10 is comprised of a pair of cup-shaped housing pieces 10a and 10b which are jointed together at the open ends thereof. The housing 10 has a pair of bearings 11 and 12 mounted therein, via which a rotating shaft 13 is rotatably supported by the housing 10. The rotor 14 is received in the housing 10 and fixed on the rotating shaft 13. The stator 20 is fixed in the housing 10 so as to surround the radially outer periphery of the rotor 14.

Moreover, in the present embodiment, the rotating electric machine 1 further includes a cooling liquid supplier for supplying cooling liquid to a three-phase stator coil 40 of the stator 20. The cooling liquid supplier includes a nozzle 15 for discharging the cooling liquid to the stator coil 40. The nozzle 15 is mounted to the housing piece 10b so as to penetrate an axial end wall of the housing piece 10b. The nozzle 15 has a discharge outlet 15a formed at its distal end. The discharge outlet 15a is located vertically above a first coil end 41 of the stator coil 40, so as to discharge the cooling liquid to the first coil end 41.

Furthermore, in the present embodiment, the rotating electric machine 1 also includes a cooling liquid collector, a pump and a cooler, none of which are shown in the figures. The cooling liquid collector collects the cooling liquid discharged out of the discharge outlet 15a of the nozzle 15 of the cooling liquid supplier. The pump is provided to deliver the cooling liquid to the cooling liquid supplier. The cooler is provided to cool the cooling liquid which has been heated when passing through the stator coil 40 and collected by the cooling liquid collector. The cooling liquid supplier, the cooling liquid collector, the pump and the cooler together form a cooling liquid circulation circuit for circuiting the cooling liquid.

In addition, in the present embodiment, ATF (Automotive Transmission Fluid) is used as the cooling liquid. However, it should be appreciated that other conventional cooling liquids, such as cooling oil, may also be used instead of ATF.

The rotor 14 includes a plurality of permanent magnets that form a plurality of magnetic poles on the radially outer periphery of the rotor 14 facing the radially inner periphery of the stator 20. The polarities of the magnetic poles alternate between north and south in the circumferential direction of the rotor 14. The number of the magnetic poles can be suitably set according to the design specification of the rotating electric machine 1. In the present embodiment, the number of the magnetic poles is set to be equal to, for example, eight (i.e., four north poles and four south poles).

Figure 2:
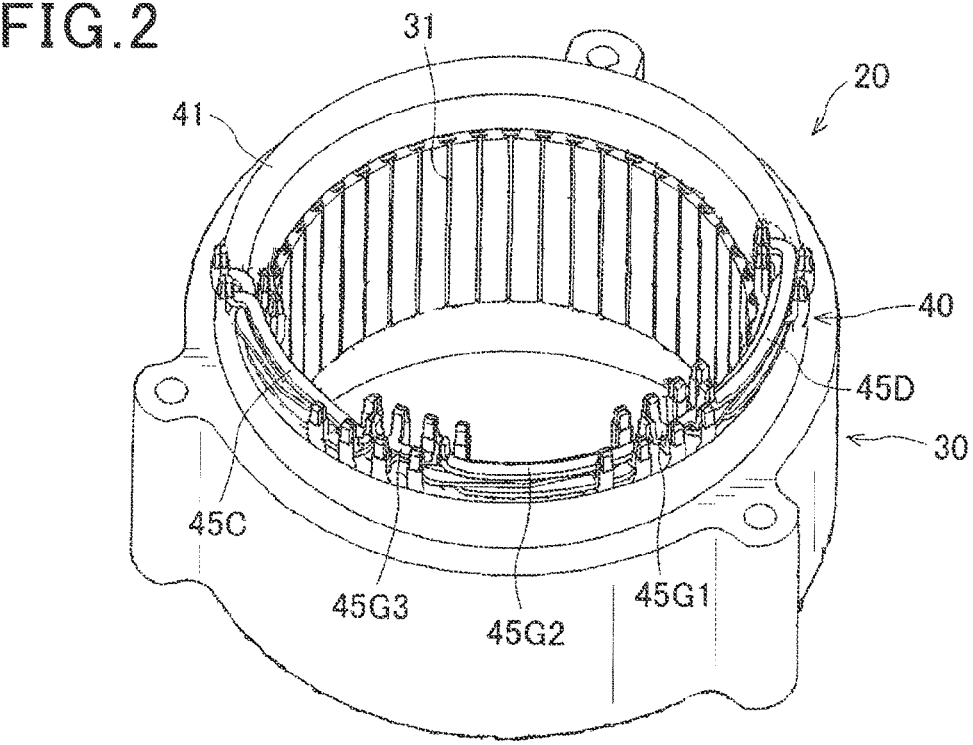
FIG. 2 is a perspective view of a stator according to the first embodiment omitting part of a coil end of a stator coil of the stator.
Figure 3:
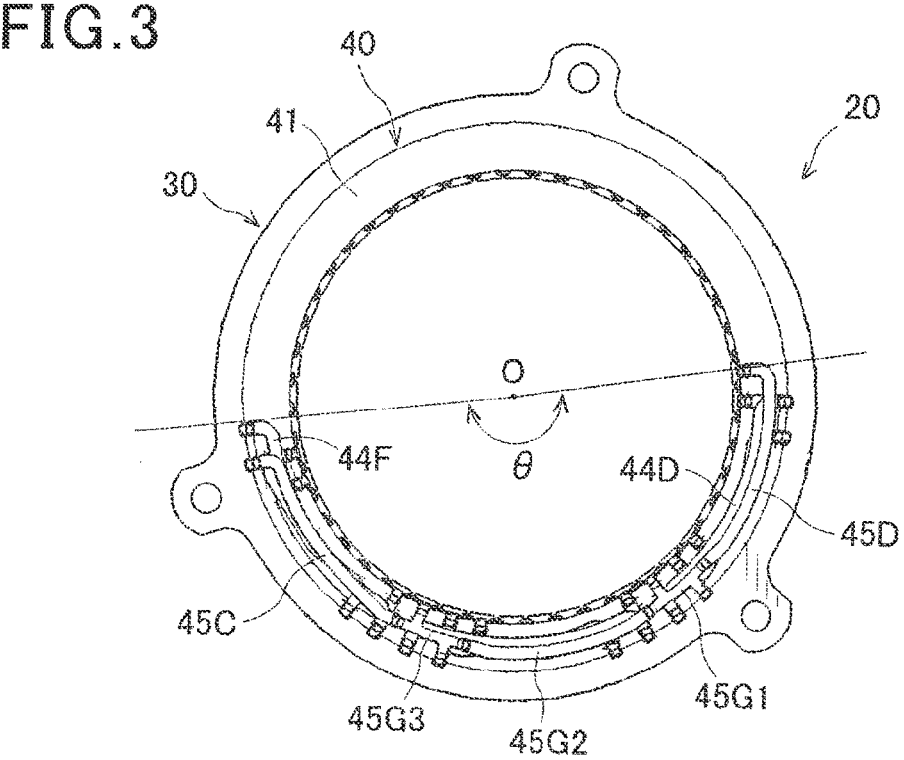
FIG. 3 is a plan view of the stator according to the first embodiment omitting part of the coil end of the stator coil.

Referring now to FIGS. 2 and 3, the stator 20 includes an annular (or hollow cylindrical) stator core 30, which is disposed radially outside the rotor 14 so as to surround the rotor 14, and the three-phase stator coil 40 mounted on the stator core 30. In addition, the stator 20 may further have insulating paper interposed between the stator core 30 and the stator coil 40.

In the present embodiment, the stator core 30 is formed by laminating a plurality of annular magnetic steel sheets in the axial direction of the stator core 30 and fixing them together by, for example, staking. In addition, between each adjacent pair of the magnetic steel sheets, there is interposed an insulating film. It should be appreciated that other conventional metal sheets may also be used instead of the magnetic steel sheets.

Moreover, as shown in FIGS. 2 and 3, the stator core 30 has a plurality of slots 31 formed in the radially inner surface thereof. The slots 31 extend in the axial direction of the stator core 30 so as to axially penetrate the stator core 30 and are spaced from one another at equal intervals in the circumferential direction of the stator core 30. Moreover, for each of the slots 31, the depth direction of the slot 31 coincides with a radial direction of the stator core 30.

In the present embodiment, there are provided two slots 31 per magnetic pole of the rotor 14 that has the eight magnetic poles and per phase of the three-phase stator coil 40. Accordingly, the total number of the slots 31 provided in the stator core 30 is equal to 48 (i.e., 2×8×3).

Figure 4A:
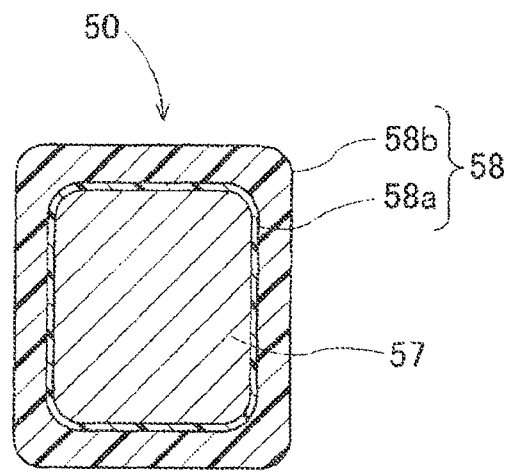
FIG. 4A is a cross-sectional view illustrating the configuration of electric wires forming the stator coil.

The stator coil 40 is formed of a plurality of electric wires 50 mounted on the stator core 30. Each of the electric wires 50 is configured with, as shown in FIG. 4A, an electric conductor 57 and an insulating coat 58 that covers the outer surface of the electric conductor 57.

In the present embodiment, the electric conductor 57 is made of copper and has a substantially rectangular cross section perpendicular to its longitudinal axis. The insulating coat 58 is two-layer structured to include an inner layer 58*a* and an outer layer 58*b*. The thickness of the insulating coat 58 (i.e., the sum of thicknesses of the inner and outer layers 58*a* and 58*b*) is set to be in the range of 100 to 200 μm.

With such a large thickness of the two-layer structured insulating coat 58, it is possible to reliably insulate the electric wires 50 from one another without interposing insulating paper therebetween. However, it is also possible to interpose insulating paper between the electric wires 50 so as to further enhance the electrical insulation therebetween.

Further, the outer layer 58*b* is made of an insulating material such as nylon. The inner layer 58*a* is made of a thermoplastic resin having a higher glass transition temperature than the outer layer 58*b* or an insulating material having no glass transition temperature such as a polyamide-imide resin. Consequently, the outer layer 58*b* will be softened by heat generated in the rotating electric machine 1 earlier than the inner layer 58*a*. As a result, those portions of the electric wires 50 which are received in the same ones of the slots 31 of the stator core 30 will be integrated into a rigid body, thereby enhancing the mechanical strength thereof. Moreover, when the stator coil 40 is subjected to excessive vibration, the adhesion between the inner and outer layers 58*a* and 58*b* will be broken down earlier than the adhesion between the inner layer 58*a* and the electric conductor 57, thereby keeping the electric conductor 57 covered and thus electrically insulated by the inner layer 58*a*.

Figure 4B:
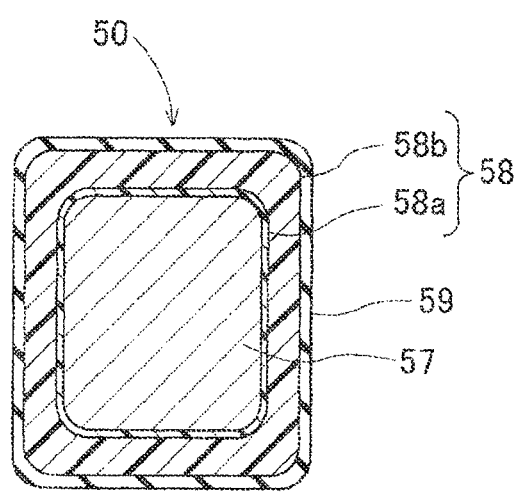
FIG. 4B is a cross-sectional view illustrating a modification of the configuration of the electric wires shown in FIG. 4A.

Furthermore, as shown in FIG. 4B, it is also possible for each of the electric wires 50 to further include a fusible coat 59 to cover the outer surface of the insulating coat 58; the fusible coat 59 may be made, for example, of epoxy resin. In this case, the fusible coats 59 of the electric wires 50 will be fused by heat generated in the rotating electric machine 1 earlier than the insulating coats 58, thereby bonding together those portions of the electric wires 50 which are received in the same ones of the slots 31 of the stator core 30. As a result, those portions of the electric wires 50 will be integrated into a rigid body, thereby enhancing the mechanical strength thereof. In addition, the outer layers 58*b* of the insulating coats 58 of the electric wires 50 may also be made of PPS (polyphenylene sulfide).

Moreover, each of the electric wires 50 forming the stator coil 40 is wave-shaped (or wave-wound around the stator core 30) to include a plurality of straight in-slot portions and a plurality of turn portions. Each of the in-slot portions is received in a corresponding one of the slots 31 of the stator core 30. Each of the turn portions is located outside the slots 31 of the stator core 30 and connects a corresponding adjacent pair of the in-slot portions.

More specifically, in the present embodiment, for each of the electric wires 50, the in-slot portions of the electric wire 50 are received in the corresponding slots 31 of the stator core 30 which are circumferentially spaced from one another at, for example, a six-plot pitch (i.e., 3 (the number of phases)×2 (the slot multiplier number)=6). Moreover, all the turn portions of the electric wires 50 which protrude outside of the slots 31 from one axial end face (i.e., the right end face in FIG. 1) of the stator core 30 together make up the first coil end 41 of the stator coil 40 which is annular in shape. On the other hand, all the turn portions of the electric wires 50 which protrude outside of the slots 31 from the other axial end face (i.e., the left end face in FIG. 1) of the stator core 30 together make up an annular second coil end 42 of the stator coil 40. That is, the stator coil 40 has the pair of first and second coil ends 41 and 42 respectively protruding front the opposite pair of axial end faces of the stator core 30.

As shown in FIG. 5, in the present embodiment, the stator coil 40 is comprised of first and second winding sets.

The first winding set consists of a U-phase winding U1, a V-phase winding V1 and a W-phase winding W1, which are star-connected to define a neutral point N1 therebetween. The U-phase, V-phase and W-phase windings U1, V1 and W1 are different in phase from each other by 102° C. in electrical angle (or by 8 slots). Moreover, each of the U-phase, V-phase and W-phase windings U1, V1 and W1 is comprised of a plurality of winding segments 43, more particularly of two winding segments 43 in the present embodiment. The two winding segments 43 are offset from each other by, for example, 15° in electrical angle (or by 1 slot).

Similarly, the second winding set consists of a U-phase winding U2, a V-phase winding V2 and a W-phase winding W2, which are star-connected to define a central point N2 therebetween. The U-phase, V-phase and W-phase windings U2, V2 and W2 are different in phase from each other by 120° in electrical angle. Moreover, each of the U-phase, V-phase and W-phase windings U2, V2 and W2 is comprised of a plurality of winding segments 43, more particularly of two winding segments 43 in the present embodiment. The two winding segments 43 are offset from each other by, for example, 15° in electrical angle.

That is, in the present embodiment, each of the U, V and W phases of the stator coil 40 is made up of four winding segments 43.

Moreover, in the present embodiment, the stator coil 40 has a plurality of intraphase bridging wires 44A-44I each of which bridges for extends to electrically connect) a corresponding pair of the winding segments 43 belonging to a same one of the U, V and W phases.

Specifically, the intraphase bridging wire 44A bridges the two winding segments 43 of the U-phase winding U1 in the first winding set. The intraphase bridging wire 44B bridges the two winding segments 43 of the V-phase winding V1 in the first winding set. The intraphase bridging wire 44C bridges the two winding segments 43 of the W-phase winding W1 in the first winding set. The intraphase bridging wire 44D bridges the two winding segments 43 of the U-phase winding U2 in the second winding set. The intraphase bridging wire 44E bridges the two winding segments 43 of the V-phase winding V2 in the second winding set. The intraphase bridging wire 44F bridges the two winding segments 43 of the W-phase winding W2 in the second winding set.

Moreover, the intraphase bridging wire 44G bridges the output-side winding segment 43 of the U-phase winding U1 in the first winding set and the output-side winding segment 43 of the U-phase winding U2 in the second winding set. The intraphase bridging wire 44H bridges the output-side winding segment 43 of the V-phase winding V1 in the first winding set and the output-side winding segment 43 of the V-phase winding V2 in the second winding set. The intraphase bridging wire 44I bridges the output-side winding segment 43 of the W-phase winding W1 in the first winding set and the output-side winding segment 43 of the W-phase winding W2 in the second winding set.

Further the intraphase bridging wire 44G is electrically connected with an output lead wire 46A. The intraphase bridging wire 44H is electrically connected with an output lead wire 46B. The intraphase bridging wire 44I is electrically connected with an output lead wire 46C.

Furthermore, in the present embodiment, the stator coil 40 also has a plurality of interphase bridging wires 45A-45G for electrically connecting neutral point-side ends of the phase windings U1-W1 and U2-W2 to each other.

Specifically, the interphase bringing wire 45A electrically connects the neutral point-side end of the neutral point-side wire segment 43 of the U-phase winding U1 to the neutral point N1 in the first winding set. The interphase bridging wire 45B electrically connects the neutral point-side end of the neutral point-side wire segment 43 of the V-phase winding V1 to the neutral point N1 in the first winding set. The interphase bridging wire 45C electrically connects the neutral point-side end of the neutral point-side wire segment 43 of the W-phase winding W1 to the neutral point N1 in the first winding set. The interphase bridging wire 45D electrically connects the neutral point-side end of the neutral point-side wire segment 43 of the U-phase winding U2 to the neutral point N2 in the second winding set. The interphase bridging wire 45E electrically connects the neutral point-side end of the neutral point-side wire segment 43 of the V-phase winding V2 to the neutral point N2 in the second winding set. The interphase bridging wire 45F electrically connects the neutral point-side end of the neutral point-side wire segment 43 of the W-phase winding W2 to the neutral point N2 in the second winding set. The interphase bridging wire 45G electrically connects the neutral point N1 in the first winding set to the neutral point N2 in the second winding set.

In addition, in the present embodiment, the electrical connection between the winding segments 43 of the phase windings U1-W1 and U2-W2, the intraphase bridging wires 44A-44I and the interphase bridging wires 45A-45G is made by, for example, welding.

Moreover, in the present embodiment, the intraphase bridging wires 44A-44I and the interphase bridging wires 45A-45G are made up of a plurality of busbars each having a predetermined shape and length. Further, as shown in FIGS. 2-3 and 6-7, the intraphase bridging wires 44A-44I and the interphase bridging wires 45A-45G are arranged on the first coil end 41 of the stator coil 40 so as to protrude axially outward from the first coil end 41. In addition, it should be noted that for the sake of simplicity, the details of the turn portions of the electric wires 50 forming the first coil end 41 are not depicted in FIGS. 2-3 and 6-7.

Figure 6:
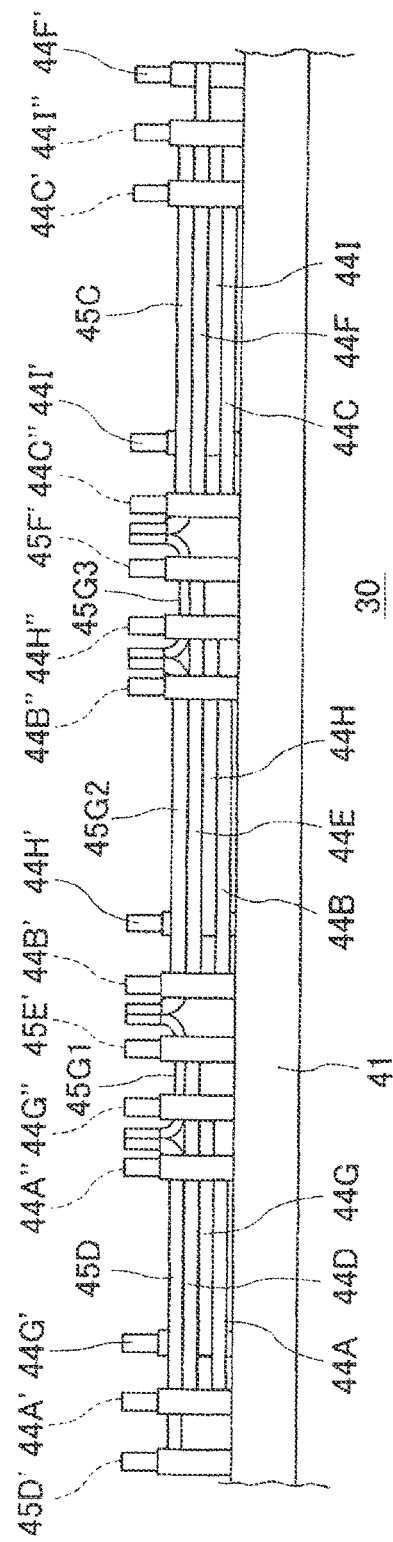
FIG. 6 is a development view illustrating the arrangement of intraphase and interphase bridging wires of the stator coil of the stator according to the first embodiment, wherein the intraphase and interphase bridging wires are developed in the circumferential direction of an annular stator core of the stator and viewed from the radially inside of the stator core.
Figure 7:
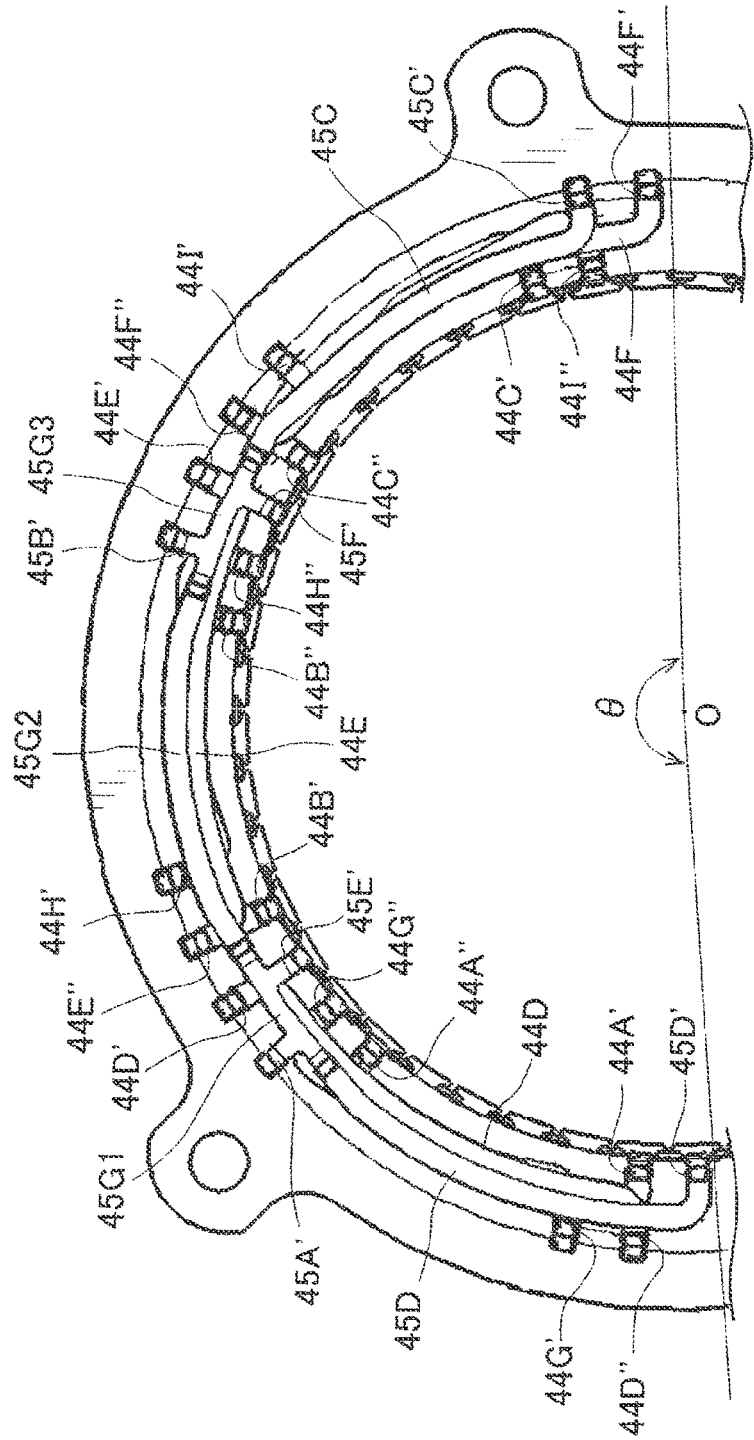
FIG. 7 is a plan view of part of the stator according to the first embodiment.

Furthermore, in the present embodiment, the interphase bridging wire 45G, which electrically connects the neutral points N1 and N2 of the first and second winding sets as shown in FIG. 5, is made up of a first busbar 45G1, a second busbar 45G2 and a third busbar 45G3 as shown as FIGS. 6 and 7. The first to the third busbars 45G1-45G3 are formed separately and joined to each other by, for example, welding.

Specifically, the first busbar 45G1 is formed integrally with the interphase bridging wires 45A and 45E. As shown in FIGS. 6 and 7, the first busbar 45G1 has two connecting end portions (or terminal portions) formed respectively in the interphase bridging wires 45A and 45E and another two connecting end portions joined respectively to the interphase bridging wire 45D and the second busbar 45G2. That is, the first busbar 45G1 is quadfurcated (i.e., divided into four branches) to have the four connecting end portions.

The second busbar 45G2 has two connecting end portions joined respectively to the first busbar 45G1 and the third busbar 45G3.

The third busbar 45G3 is formed integrally with the interphase bridging wires 45B and 45F. As shown in FIGS. 6 and 7, the third busbar 45G3 has two connecting end portions formed respectively in the interphase bridging wires 45B and 45F and another two connecting end portions joined respectively to the second busbar 45G2 and the interphase bridging wire 45C. That is, the third busbar 45G3 is also quadfurcated to have the four connecting end portions.

In addition, it should be noted that in FIGS. 6 and 7, for each of the intraphase bridging wires 44A-44I and the interphase bridging wires 45A-45G, the superscript ['] is used to designate one connecting end portion of the bridging wire, and the superscript ["] is used to designate the other connecting end portion of the bridging wire.

Furthermore, in the present embodiment, the intraphase bridging wires 44A-44I and the interphase bridging wires 45A-45G are arranged on the first coil end 41 of the stator coil 40 so that at least one of the intraphase bridging wires 44A-44I is in direct contact with at least one of the interphase bridging wire 45A-45G.

Specifically, as shown in FIG. 6, in the present embodiment, on the first coil end 41 of the stator coil 40, the interphase bridging wires 45C, 45D and 45G are arranged at the axially outermost layer (i.e., the uppermost layer in FIG. 6). In addition, as described previously, the interphase bridging wire 45G is formed integrally with the interphase bridging wires 45A-45B and 45E-45F. Further, at the second layer (i.e., the second axially outermost layer), there are arranged the intraphase bridging wires 44D-44F so that each of the intraphase bridging wires 44D-44F is in direct contact with any of the interphase bridging wires 45C, 45D and 45G arranged at the first layer (i.e., the axially outermost layer). Moreover, at the third layer, there are arranged the intraphase bridging wires 44G-44I so that each of the intraphase bridging wires 44G-44I is in direct contact with any of the intraphase bridging wires 44D-44F arranged at the second layer. Furthermore, at the fourth layer, there are arranged the intraphase bridging wires 44A-44C so that each of the intraphase bridging wires 44A-44C is in direct contact with any of the intraphase bridging wires 44G-44I arranged at the third layer.

That is, in the present embodiment, each of the intraphase bridging wires 44D-44F arranged at the second layer is in direct contact with at least one of the interphase bridging wires 45C, 45D and 45G arranged at the first layer. Each of the intraphase bridging wires 44G-44I arranged at the third layer is in indirect contact with at least one of the interphase bridging wires 45C, 45D and 45G arranged at the first layer via the intraphase bridging wires 44D-44F arranged at the second layer. Each of the intraphase bridging wires 44A-44C arranged at the fourth layer is in indirect contact with at least one of the interphase bridging wires 45C, 45D and 45G arranged at the first layer via the intraphase bridging wires 44D-44F arranged at the second layer and the intraphase bridging wires 44G-44I arranged at the third layer. Consequently, if is possible to secure a large heat dissipation area for the interphase bridging wires 45C, 45D and 45G where it is easiest for the temperature of the stator coil 40 to become high when electric current flows in the stator coil 40.

Furthermore, in the present embodiment, among the nine intraphase bridging wires 44A-44I, each of the three intraphase bridging wires 44G-44I bridges the pair of the output-side ends of the output-side winding segments 43 of the phase windings belonging to a corresponding one of the U, V and W phases (see FIG. 5). Further, as shown in FIG. 7, for each of the intraphase bridging wires 44G-44I, one of the pair of the output-side ends of the output-side winding segments 43 bridged by the intraphase bridging wire is led out from the radially outer periphery of the first coil end 41 while the other output-side end is led out from the radially inner periphery of the first coil end 41. That is, each of the intraphase bridging wires 44G-44I is configured to extend across the first coil end 41 of the stator coil 40 from the radially outer periphery to the radially inner periphery of the first coil end 41. Consequently, it is possible to easily bring radially central portions of the intraphase bridging wires 44G-44I into indirect contact with the interphase bridging wires 45C, 45D and 45G via the intraphase bridging wires 44D-44F.

Moreover, the cooling liquid supplier is configured so that the cooling liquid discharged out of the discharge outlet 15a of the nozzle 15 (see FIG. 1) is sprayed onto at least one of the intraphase bridging wires 44A-44I and the interphase bridging wires 45C, 45D and 45G, more particularly sprayed toward the second busbar 45G2 which makes up a central part of the interphase bridging wire 45G in the present embodiment (see FIG. 7).

Furthermore, in the present embodiment, as shown in FIGS. 3 and 7, when viewed along the longitudinal axis O of the stator core 30, all of the intraphase bridging wires 44A-44I and the interphase bridging wires 45A-45G are arranged within an angular range θ. In other words, the parameter θ represents the angle formed between two imaginary lines extending from the longitudinal axis O of the stator core 30 respectively through opposite circumferential ends of the arrangement range of the intraphase bridging wires 44A-44I and the interphase bridging wires 45A-45G. Further, in the present embodiment, the angular range θ is specified to satisfy the following relationship:

$$\theta \geq p \times 360/n \quad (1)$$

where p is a natural number greater than or equal to 2 and represents the number of the winding segments 43 making up each phase of the three-phase stator coil 40, and n is an even number greater than or equal to 2 and represents the number of the magnetic poles of the rotor 14.

Accordingly, in the present embodiment, with p=4 and n=8, the angular range θ is specified to be greater than or equal to 180°.

Figure 8:
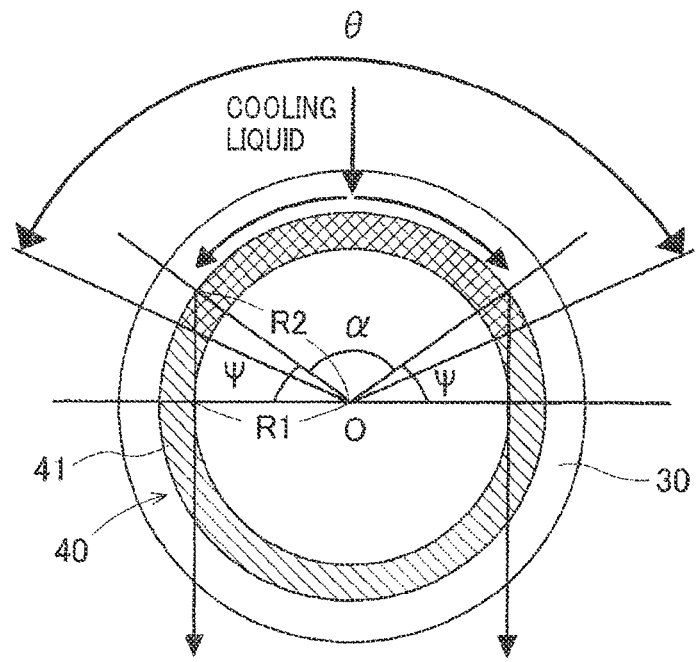
FIG. 8 is a schematic view illustrating an angular range θ within which the intraphase and interphase bridging wires are arranged on the coil end of the stator coil in the stator according to the first embodiment.

In addition, to effectively cool the first coil end 41 of the stator coil 40, it is preferable that the angular range θ is wider than an angular range α as shown in FIG. 8. Here, the angular range α is a range within which the cooling liquid sprayed onto the uppermost point in the first coil end 41 can flow along the first coil end 41 on both circumferential sides of the uppermost point while cooling the first coil end 41 without directly falling down from the first coil end part 41. The angular range α can be determined by the following equations:

$$\alpha = \overline{\omega} - 2 \times \psi \, [\text{rad}] \quad (2)$$

$$\psi = \text{Cos}^{-1}(R1/R2) \, [\text{rad}] \quad (3)$$

where R1 is the inner radius of the first coil end 41, and R2 is the outer radius of the first coil end 41.

Next, operation of the rotating electric machine 1 according to the present embodiment will be described.

The rotating electric machine 1 is mounted at a predetermined position in the vehicle so that the axial direction of the rotating shaft 13 coincides with a horizontal direction, and the discharge outlet 15a of the nozzle 15 of the cooling liquid supplier is positioned vertically above the first coil end 41 of the stator coil 40.

Upon supply of electric current to the stator coil 40, the rotor 14 rotates in a predetermined direction. Moreover, with the rotation of the rotor 14, the rotating shaft 13 also rotates in the predetermined direction, driving other devices or components mechanically connected to the rotating shaft 13.

At the same time, the cooling liquid supplier starts its operation, causing the cooling liquid to be discharged out of the discharge outlet 15a of the nozzle 15. The discharged cooling liquid is then sprayed toward the second busbar 45G2 which makes up the central part of the interphase bridging wire 45G and is positioned highest in the intraphase bridging wires 44A-44I and the interphase bridging wires 45C, 45D and 45G (see FIG. 7).

Further, the cooling liquid, which has been sprayed onto the second busbar 45G2, flows downward on both circumferential sides of the second busbar 45G2 along the surfaces of the intraphase bridging wires 44A-44I and the interphase bridging wires 45C, 45D and 45G while cooling those intraphase and interphase bridging wires.

As described previously, when electric current flows in the stator coil 40, it is easiest for the temperature of the stator coil 40 to become high at the interphase bridging wires 45C, 45D and 45G. However, in the present embodiment, each of the intraphase bridging wires 44A-44I is arranged in either direct of indirect contact with at least one of the interphase bridging wires 45C, 45D and 45G, thereby securing a large heat dissipation area for the interphase bridging wires 45C, 45D and 45G. Consequently, the interphase bridging wires 45C, 45D and 45G can be effectively cooled by the cooling liquid which flows along the surfaces of the intraphase bridging wires 44A-44I and the interphase bridging wires 45C, 45D and 45G. In addition, after reaching the lowest position in the intraphase bridging wires 44A-44I and the interphase bridging wires 45C and 45D, the cooling liquid turns to flow downward along the surfaces of those turn portions of the electric wires 50 which make up the first coil end 41 of the stator coil 40.

On the other hand, the cooling liquid, which has been discharged out of the discharge outlet 15a of the nozzle 15 but not sprayed onto the second busbar 45G2, is sprayed onto an uppermost part of the first coil end 41 which is located in the vicinity of the second busbar 45G2. Then, the cooling liquid sprayed onto the uppermost part of the first coil end 41 flows downward on both circumferential sides of the uppermost part along the surfaces of those turn portions of the electric wires 50 which make up the first coil end 41, while cooling those turn portions.

Finally, all the cooling liquid discharged out of the discharge outlet 15a of the nozzle 15 reaches a lowest part of the first coil end 41, and then falls down from the lowest part. Thereafter, the cooling liquid is collected by the cooling liquid collector and returned to the cooling liquid circulation circuit via a drain hole (not shown) formed in the housing 10. Consequently, with circulation of the cooling liquid via the cooling liquid circulation circuit, the intraphase bridging wires 44A-44I, the interphase bridging wires 45C, 45D and 45G and the first coil end 41 of the stator coil 40 can be repeatedly cooled by the cooling liquid.

After having described the configuration and operation of the rotating electric machine 1 according to the present embodiment, advantages thereof will be described hereinafter.

In the present embodiment, the rotating electric machine 1 includes the rotor 14 and the stator 20. The stator 20 includes the annular stator core 30 and the three-phase stator coil 40. The stator core 30 is disposed in radial opposition to the rotor 14 and has the slots 31 arranged in the circumferential direction of the stator core 30. The stator coil 40 is comprised of the phase windings U1-W1 and U2-W2 that are star-connected to one another. The phase windings U1-W1 and U2-W2 are partially received in the slots 31 of the stator core 30 so that parts of the phase windings U1-W1 and U2-W2 are located outside the slots 31 to make up the pair of first and second coil ends 41 and 42 of the stator coil 40. The first and second coil ends 41 and 42 protrude respectively from the opposite axial end faces of the stator core 30. Each of the phase windings U1-W1 and U2-W2 of the stator coil 40 is comprised of the two winding segments 43. The stator coil 40 further has the intraphase bridging wires 44A-44I electrically connecting the winding segments 43 of the same phase and the interphase bridging wires 45A-45G electrically connecting the neutral point-side ends of the phase windings U1-W1 and U2-W2. In addition, in the present embodiment, the interphase bridging wire 45G is formed integrally with the interphase bridging wires 45A-45B and 45E-45F. Further, all of the intraphase and interphase bridging wires 44A-44I and 45A-45G are arranged on the first coil end 41 of the stator coil 40 so that at least one of the intraphase bridging wires 44A-44I is in direct contact with at least one of the interphase bridging wires 45A-45G.

More particularly, in the present embodiment, each of the intraphase bridging wires 44A-44I is in either direct or indirect contact with at least one of the interphase bridging wires 45A-45G.

With the above arrangement, it is possible to secure a large heat dissipation area for the interphase bridging wires 45A-45G where it is easiest for the temperature of the stator coil 40 to become high when electric current flows in the stator coil 40. Consequently, it is possible to secure a high cooling performance of the stator coil 40.

Moreover, in the present embodiment, each of the intraphase bridging wires 44G-44I electrically connects the pair of the output-side ends of the output-side winding segments 43 of the phase windings belonging to a corresponding one of the U, V and W phases; one of the pair of the output-side ends is led out from the radially outer periphery of the first coil end 41 of the stator coil 40 while the other output-side end is led out from the radially inner periphery of the first coil end 41. Accordingly, each of the intraphase bridging wires 44G-44I is configured to extend across the first coil end 41 from the radially outer periphery to the radially inner periphery of the first coil end 41.

With the above configuration, it is possible to easily bring the radially central portions of the intraphase bridging wires 44G-44I into indirect contact with the interphase bridging wires 45C, 45D and 45G via the intraphase bridging wires 44D-44F.

In the present embodiment, the rotating electric machine 1 further includes the cooling liquid supplier that supplies the cooling liquid to at least one of the intraphase bridging wires 44A-44I and the interphase bridging wires 45C, 45D and 45G. More particularly, in the present embodiment, the cooling liquid supplier is configured so that the cooling liquid discharged out of the discharge outlet 15a of the nozzle 15 is sprayed toward the second busbar 45G2 which makes up the central part of the interphase bridging wire 45G and is positioned highest in the intraphase bridging wires 44A-44I and the interphase bridging wires 45C, 45D and 45G.

With the above configuration, it is possible to more effectively and reliably cool the interphase bridging wire 45G where it is easiest for the temperature of the stator coil 40 to become high when electric current flows in the stator coil 40.

In the present embodiment, the angular range θ, within which all of the intraphase bridging wires 44A-44I and the interphase bridging wires 45A-45G are arranged, is specified to be wider than or equal to p×360/n [rad]. More particularly, in the present embodiment, with n set to 8 and p set to 4, the angular range θ is specified to be wider than or equal to 180° C.

Specifying the angular range θ as above, it is possible to allow the cooling liquid to flow through each of the intraphase bridging wires 44A-44I and the interphase bridging wires 45A-45G. Consequently, it is possible to improve the effect of cooling the stator coil 40 by the cooling liquid.

Modification of First Embodiment

In this modification, the rotor 14 has twelve magnetic poles formed therein, and each phase of the stator coil 40 is made up of four winding segments 43.

Figure 9:
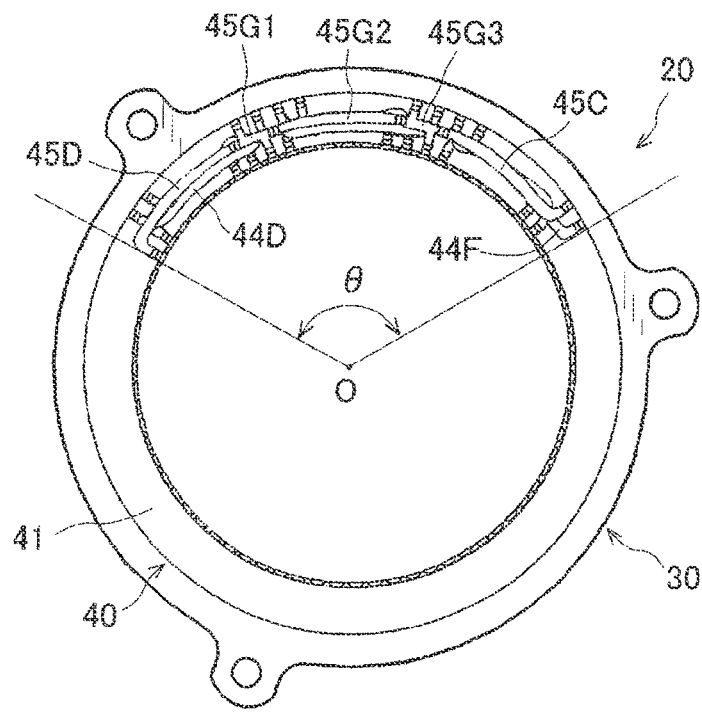
FIG. 9 is a schematic plan view of a stator according to a modification of the first embodiment.

Consequently, with n set to 12 and p set to 4, the angular range θ, within which all of the intraphase bridging wires 44A-44I and the interphase bridging wires 45A-45G are arranged, is specified to be wider than or equal to 120° as shown in FIG. 9.

In addition, in this modification, the number of the slots 31 provided in the stator core 30 is equal to 72 (i.e., 2×12×3), which is equal to 1.5 times the number of the slots 31 provided in the stator core 30 in the first embodiment. Accordingly, the angular range θ is reduced to 1/1.5 of the angular range θ in the first embodiment.

Second Embodiment

Figure 10:
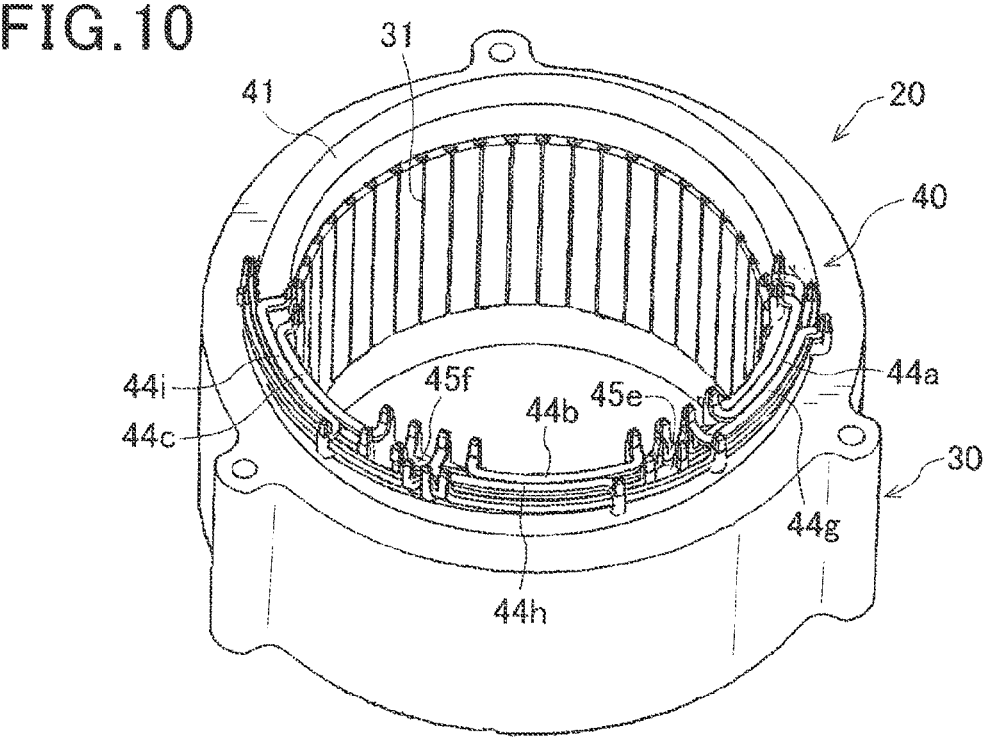
FIG. 10 is a perspective view of a stator according to a second embodiment omitting part of a coil end of a stator coil of the stator.
Figure 11:
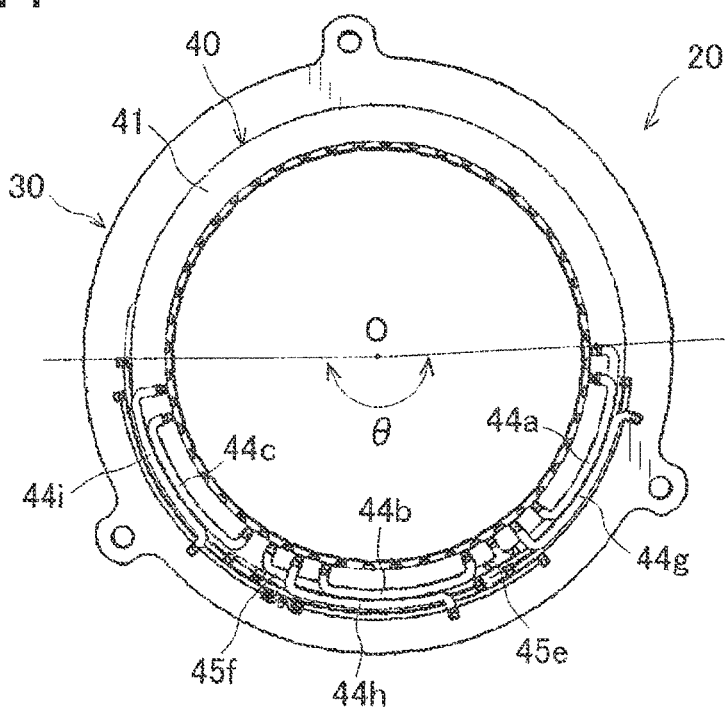
FIG. 11 is a plan view of the stator according to the second embodiment omitting part of the coil end of the stator coil.

FIGS. 10 and 11 show the overall configuration of a stator 20 according to a second embodiment.

In the present embodiment, the stator 20 includes a stator core 30, which is identical to the stator core 30 in the first embodiment, and a three-phase stator coil 40 that is slightly different from the stator coil 40 in the first embodiment.

Figure 12:
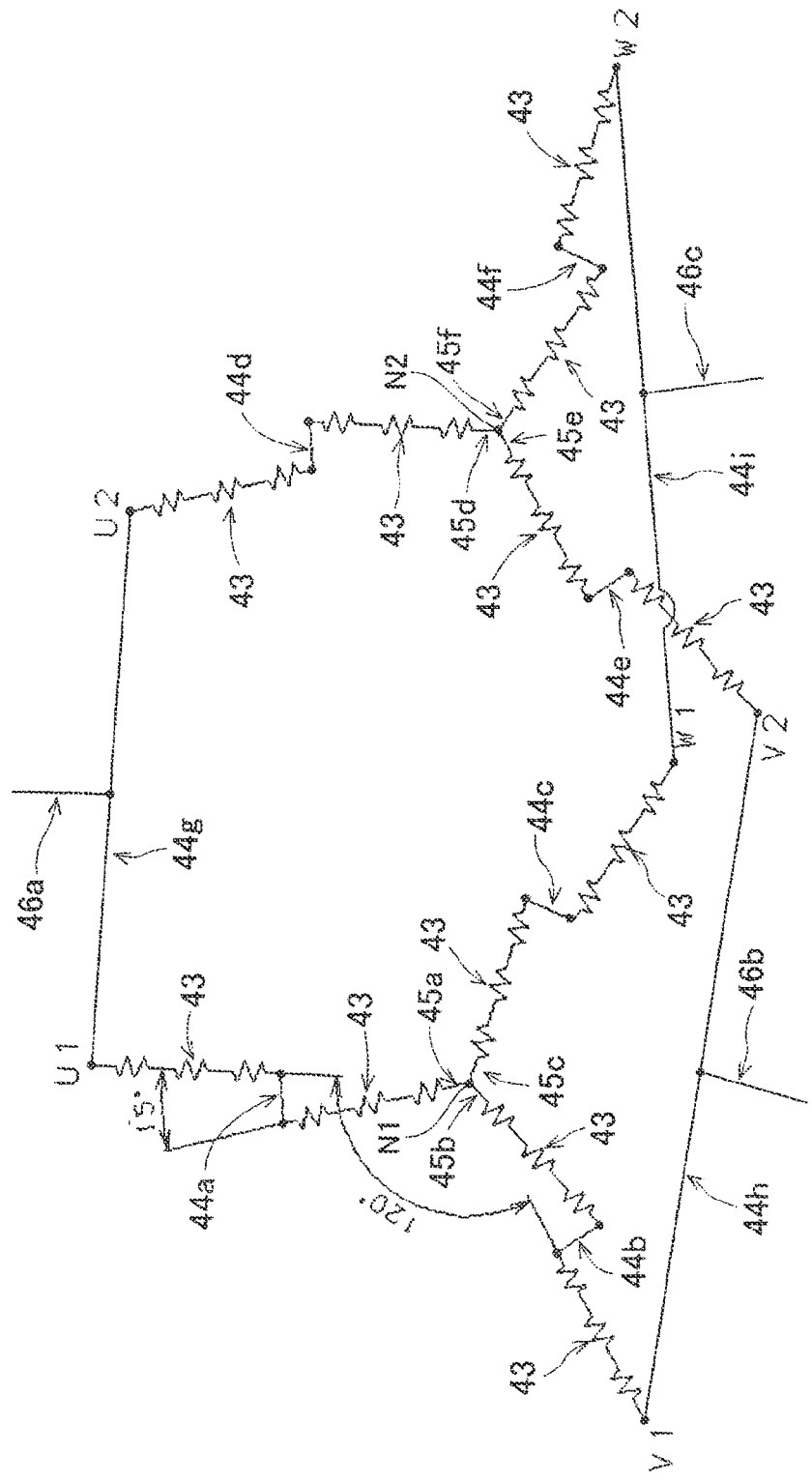
FIG. 12 is a schematic circuit diagram of the stator according to the second embodiment.

Specifically, in the present embodiment, as shown in FIG. 12, the stator coil 40 is comprised of first and second winding sets.

The first winding set consists of a U-phase winding U1, a V-phase winding V1 and a W-phase winding W1, which are star-connected to define a neutral point N1 therebetween. The U-phase, V-phase and W-phase windings U1, V1 and W1 are different in phase from each other by 120° in electrical angle. Moreover, each of the U-phase, V-phase and W-phase windings U1, V1 and W1 is comprised of a plurality of winding segments 43, more particularly of two winding segments 43 in the present embodiment. The two winding segments 43 are offset from each other by, for example, 15° in electrical angle.

Similarly, the second winding set consists of a U-phase winding U2, a V-phase winding V2 and a W-phase winding W2, which are star-connected to define a neutral point N2 therebetween. The U-phase, V-phase and W-phase windings U2, V2 and W2 are different in phase from each other by 120° in electrical angle. Moreover, each of the U-phase, W-phase and W-phase windings U2, V2 and W2 is comprised of a plurality of winding segments 43, more particularly of two winding segments 43 in the present embodiment. The two winding segments 43 are offset from each other by, for example, 15° in electrical angle. That is, in the present embodiment, each of the U, V and W phases of the stator coil 40 is made up of four winding segments 43.

Moreover, in the present embodiment, the stator coil 40 has a plurality of intraphase bridging wires 44a-44i each of which bridges a corresponding pair of the winding segments 43 belonging to a same one of the U, V and W phases.

Specifically, the intraphase bridging wire 44a bridges the two winding segments 43 of the U-phase winding U1 in the first winding set. The intraphase bridging wire 44b bridges the two winding segments 43 of the V-phase winding V1 in the first winding set. The intraphase bridging wire 44c bridges the two winding segments 43 of the W-phase winding W1 in the first winding set. The intraphase bridging wire 44d bridges the two winding segments 43 of the U-phase winding U2 in the second winding set. The intraphase bridging wire 44e bridges the two winding segments 43 of the V-phase winding V2 in the second winding set. The intraphase bridging wire 44f bridges the two winding segments 43 of the W-phase winding W2 in the second winding set.

Moreover, the intraphase bridging wire 44g bridges the output-side winding segment 43 of the U-phase winding U1 in the first winding set and the output-side winding segment 43 of the U-phase winding U2 in the second winding set. The intraphase bridging wire 44h bridges the output-side winding segment 43 of the V-phase winding V1 in the first winding set and the output-side winding segment 43 of the V-phase winding V2 in the second winding set. The intraphase bridging wire 44i bridges the output-side winding segment 43 of the W-phase winding W1 in the first winding set and the output-side winding segment 43 of the W-phase winding W2 in the second winding set.

Further, the intraphase bridging wire 44g is electrically connected with an output lead wire 46a. The intraphase bridging wire 44h is electrically connected with an output lead wire 46b. The intraphase bridging wire 44i is electrically connected with an output lead wire 46c.

Furthermore, in the present embodiment, the stator coil 40 also has a plurality of interphase bridging wires 45a-45f for electrically connecting neutral point-side ends of the phase windings U1-W1 and U2-W2 to each other.

Specifically, the interphase bridging wire 45a electrically connects the neutral point-side end of the neutral point-side wine segment 43 of the U-phase winding U1 to the neutral point N1 in the first winding set. The interphase bridging wire 45b electrically connects the neutral point-side end of the neutral point-side wire segment 43 of the V-phase winding V1 to the neutral point N1 in the first winding set. The interphase bridging wire 45c electrically connects the neutral point-side end of the neutral point-side wire segment 43 of the W-phase winding W1 to the neutral point N1 in the first winding set. The interphase bridging wire 45d electrically connects the neutral point-side end of the neutral point-side wire segment 43 of the U-phase winding U2 to the neutral point N2 in the second winding set. The interphase bridging wire 45e electrically connects the neutral point-side end of the neutral point-side wire segment 43 of the V-phase winding V2 to the neutral point N2 in the second winding set. The interphase bridging wire 45f electrically connects the neutral point-side end of the neutral point-side wire segment 43 of the W-phase winding W2 to the neutral point N2 in the second winding set.

However, in the present embodiment, the stator coil 40 has no interphase bridging wire electrically connecting the neutral point N1 in the first winding set to the neutral point N2 in the second winding set, unlike in the first embodiment.

In addition, in the present embodiment, the electrical connection between the winding segments 43 of the phase windings U1-W1 and U2-W2, the intraphase bridging wires 44a-44i and the interphase bridging wires 45a-45f is made by, for example, welding.

Moreover, in the present embodiment, the intraphase bridging wires 44a-44i and the interphase bridging wires 45a-45f are made up of a plurality of busbars each having a predetermined shape and length. Further, as shown in FIGS. 10-11 and 13-14, the intraphase bridging wires 44a-44i and the interphase bridging wires 45a-45f are arranged on the first coil end 41 of the stator coil 40 so as to protrude axially outward from the first coil end 41. In addition, it should be noted that for the sake of simplicity, the details of the turn portions of the electric wires 50 forming the first coil end 41 are not depicted in FIGS. 10-11 and 13-14.

Figure 13:
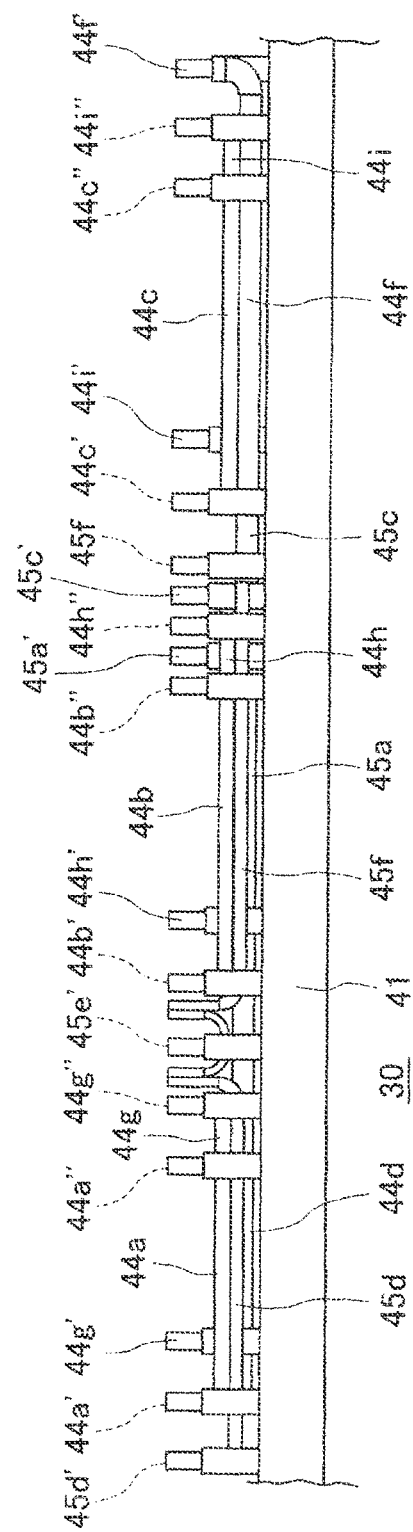
FIG. 13 is a development view illustrating the arrangement of intraphase and interphase bridging wires of the stator cost of the stator according to the second embodiment, wherein the intraphase and interphase bridging wires are developed in the circumferential direction of an annular stator core of the stator and viewed from the radially inside of the stator core.
Figure 14:
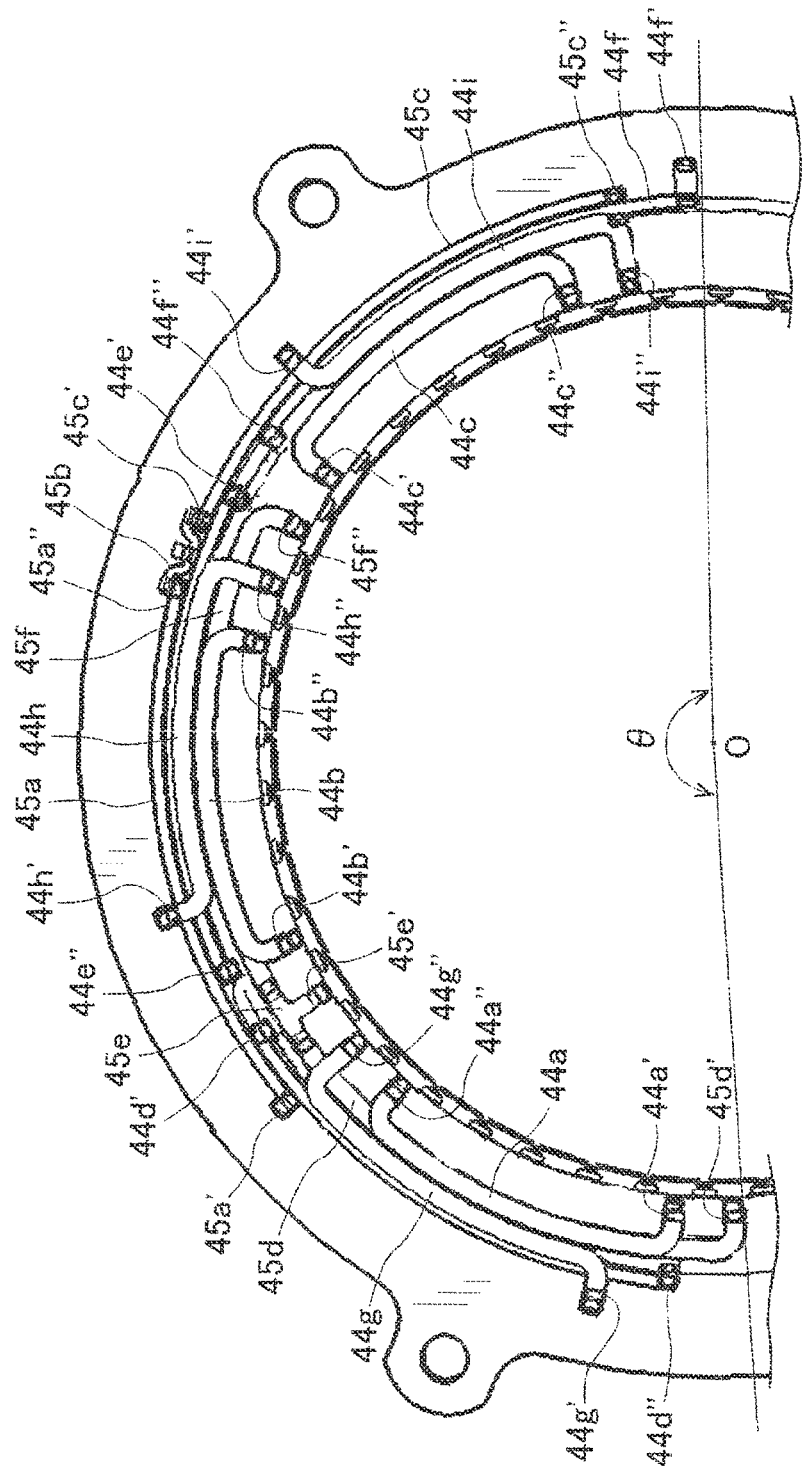
FIG. 14 is a plan view of part of the stator according to the second embodiment.

Furthermore, in the present embodiment, as shown in FIGS. 13-14, the interphase bridging wire 45e is made up of a busbar that is trifurcated (i.e., divided into three branches) to have three connecting end portions. The three connecting end portions are respectively joined to the interphase bridging wire 45d, the interphase bridging wire 45f and the neutral point-side winding segment 43 of the V-phase winding V2.

In addition, it should be noted that in FIGS. 13-14, for each of the intraphase bridging wires 44a-44i and the interphase bridging wires 45a-45f the superscript ['] is used to designate one connecting end portion of the bridging wire, and the superscript ["] is used to designate the other connecting end portion of the bridging wire.

Furthermore, in the present embodiment, the intraphase bridging wires 44a-44i and the interphase bridging wires 45a-45f are arranged on the first coil end 41 of the stator coil 40 so that at least one of the intraphase bridging wires 44a-44i is in direct contact with at least one of the interphase bridging wire 45a-45f. Specifically, as shown in FIGS. 13 and 14, in the present embodiment, on the first coil end 41 of the stator coil 40, the intraphase bridging wires 44a, 44b, 44g and 44h are arranged at the axially outermost layer (i.e., the uppermost layer in FIG. 13). Moreover, the intraphase bridging wire 44g is arranged radially outside and in direct contact with the intraphase bridging wire 44a. The intraphase bridging wire 44h is arranged radially outside and in direct contact with the intraphase bridging wire 44b. Further, at the second layer (i.e., the second axially outermost layer), there are arranged the interphase bridging wires 45d and 45f respectively in direct contact with the intraphase bridging wires 44a and 44b arranged at the first layer (i.e., the axially outermost layer).

That is, in the present embodiment, each of the intraphase bridging wires 44a and 44b arranged at the first layer is in direct contact with either of the interphase bridging wires 45d and 45f arranged at the second layer. Moreover, each of the intraphase bridging wires 44g and 44h arranged at the first layer is in indirect contact with either of the interphase bridging wires 45d and 45f via either of the intraphase bridging wires 44a and 44b. Consequently, it is possible to secure a large heat dissipation area for the interphase bridging wires 45d and 45f where it is easiest for the temperature of the stator coil 40 to become high when electric current flows in the stator coil 40.

Furthermore, in the present embodiment, the intraphase bridging wire 44g bridges the pair of the output-side ends of the output-side winding segments 43 of the U-phase windings U1 and U2; one of the pair of the output-side ends is led out from the radially outer periphery of the first coil end 41 of the stator coil 40 while the other output-side end is led out from the radially inner periphery of the first coil end 41. Similarly, the intraphase bridging wire 44h bridges the pair of the output-side ends of the output-side winding segments 43 of the V-phase windings V1 and V2; one of the pair of the output-side ends is led out from the radially outer periphery of the first coil end 41 of the stator coil 40 while the other output-side end is led out from the radially inner periphery of the first coil end 41. That is, each of the intraphase bridging wires 44g and 44h is configured to extend across the first coil end 41 of the stator coil 40 from the radially outer periphery to the radially inner periphery of the first coil end 41. Consequently, it is possible to easily bring radially central portions of the intraphase bridging wires 44g and 44h respectively into indirect contact with the interphase bridging wires 45d and 45f via the intraphase bridging wires 44a and 44b. Moreover, the cooling liquid supplier is configured so that the cooling liquid discharged out of the discharge outlet 15a of the nozzle 15 (see FIG. 1) is sprayed onto at least one of the intraphase bridging wires 44a-44i and the interphase bridging wires 45a-45f, more particularly sprayed toward the interphase bridging wires 45a and 45f and the intraphase bridging wires 44b and 44h which are circumferentially centered in all of the intraphase and interphase bridging wires (see FIG. 14).

Furthermore, in the present embodiment, as shown in FIGS. 11 and 14, when viewed along the longitudinal axis O of the stator core 30, all of the intraphase bridging wires 44a-44i and the interphase bridging wires 45a-45f are arranged within an angular range θ. The angular range θ is specified to satisfy the relationship (1) described in the first embodiment. More specifically, with n set to 8 and p set to 4, the angular range θ is specified to be wider than or equal to 180°. In addition, as described previously in the first embodiment, to effectively cool the first coil end 41 of the stator coil 40, it is preferable that the angular range θ is wider than the angular range α (see FIG. 8).

Next, operation of the rotating electric machine 1 according to the present embodiment will be described.

As in the first embodiment, at the same time as start of rotation of the rotor 14 upon supply of electric current to the stator coil 40, the cooling liquid supplier starts its operation, causing the cooling liquid to be discharged out of the discharge outlet 15a of the nozzle 15. The discharged cooling liquid is then sprayed toward the interphase bridging wires 45a and 45f and the intraphase bridging wires 44b and 44h which are circumferentially centered in all of the intraphase and interphase bridging wires 44a-44i and 45a-45f.

Further, the cooling liquid, which has been sprayed onto the interphase bridging wires 45a and 45f and the intraphase bridging wires 44b and 44h, flows downward on both circumferential sides of the bridging wires 45a, 45f, 44b and 44h along the surfaces of the interphase bridging wires 45b-45e and the intraphase bridging wires 44a, 44c-44g and 44i while cooling those intraphase and interphase bridging wires.

An described previously, when electric current flows in the stator coil 40, it is easiest for the temperature of the stator coil 40 to become high at the interphase bridging wires 45d and 45f. However, in the present embodiment, the intraphase bridging wires 44a-44b and 44g-44h are arranged in either direct or indirect contact with the interphase bridging wires 45d and 45f, thereby securing a large heat dissipation area for the interphase bridging wires 45d and 45f. Consequently, the interphase bridging wires 45d and 45f can be effectively cooled by the cooling liquid which flows along the surfaces of the intraphase and interphase bridging wires 44a-44i and 45a-45f. In addition, after reaching the lowest position in the interphase bridging wires 45c and 45d and the intraphase bridging wires 44a, 44d and 44f, the cooling liquid turns to flow downward along the surfaces of those turn portions of the electric wires 50 which make up the first coil end 41 of the stator coil 40.

On the other hand, the cooling liquid, which has been discharged out of the discharge outlet 15a of the nozzle 15 but not sprayed onto the interphase bridging wires 45a and 45f and the intraphase bridging wires 44b and 44h, is sprayed onto an uppermost part of the first coil end 41 which is located in the vicinity of the interphase and intraphase bridging wires 45a, 45f, 44b and 44h. Then, the cooling liquid sprayed onto the uppermost part of the first coil end 41 flows downward on both circumferential sides of the uppermost part along the surfaces of those turn portions of the electric wires 50 which make up the first coil end 41, while cooling those turn portions.

Finally, all the cooling liquid discharged out of the discharge outlet 15a of the nozzle 15 reaches a lowest part of the first coil end 41, and then falls down from the lowest part. Thereafter, the cooling liquid is collected by the cooling liquid collector and returned to the cooling liquid circulation circuit. Consequently, with circulation of the cooling liquid via the cooling liquid circulation circuit, the intraphase bridging wires 44a-44i, the interphase bridging wires 45a-45f and the first coil end 41 of the stator coil 40 can be repeatedly cooled by the cooling liquid.

With the above-described stator 20 according to the present embodiment, it is possible to achieve the same advantageous effects as with the stator 20 according to the first embodiment.

Modification of Second Embodiment

In this modification, the rotor 14 has twelve magnetic poles formed therein, and each phase of the stator coil 40 is made up of four winding segments 43.

Figure 15:
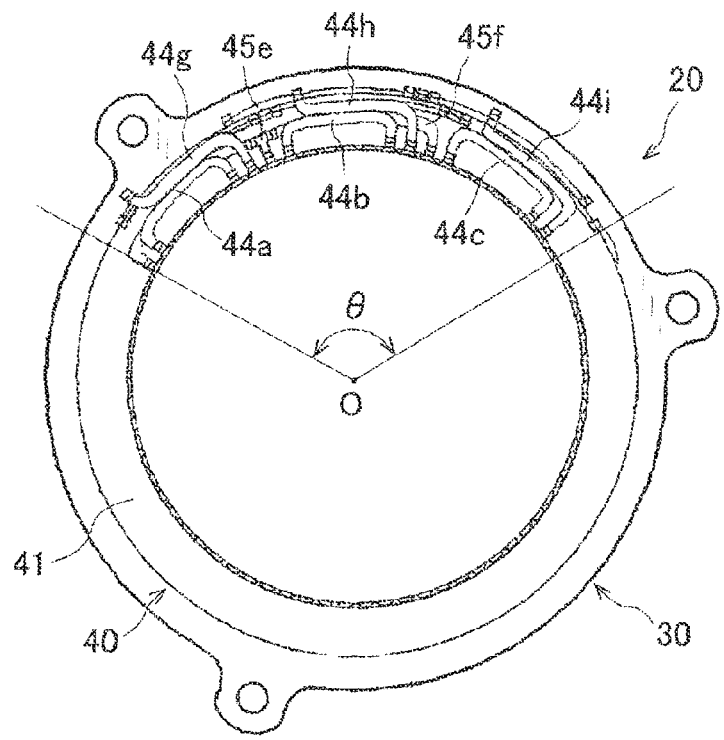
FIG. 15 is a schematic plan view of a stator according to a modification of the second embodiment.

Consequently, with n set to 12 and p set to 4, the angular range θ, within which all of the intraphase bridging wires 44a-44i and the interphase bridging wires 45a-45f are arranged, is specified to be wider than or equal to 120° as shown in FIG. 15.

In addition, in this modification, the number of the slots 31 provided in the stator core 30 is equal to 72 (i.e., 2×12×3), which is equal to 1.5 times the number of the slots 31 provided in the stator core 30 in the second embodiment. Accordingly, the angular range θ is reduced to 1/1.5 of the angular range θ in the second embodiment.

While the above particular embodiments and modifications have been shown and described, it will be understood by those skilled in the art that various further modifications, changes, and improvements may be made without departing from the spirit of the present invention.

Figure 16A:
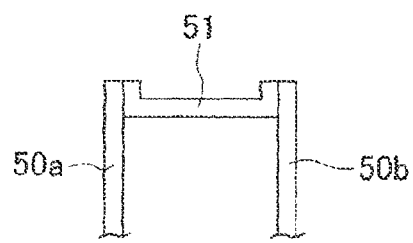
FIG. 16A is a schematic view illustrating the implementation of the intraphase and interphase bridging wires in the first and second embodiments.

For example, in the previous embodiments, the intraphase and interphase bridging wires are made up of the busbars that are different from the electric wires 50 forming the stator coil 40. More specifically, as illustrated in FIG. 16A, a busbar 51, which makes up one of the intraphase and interphase bridging wires, electrically connects two electric wires 50a and 50b that respectively make up two winding segments 43.

Figure 16B:
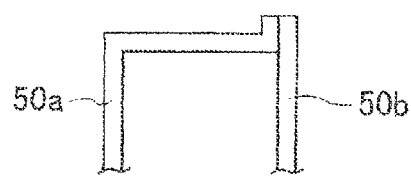
FIG. 16B is a schematic view illustrating a modified implementation of the intraphase and interphase bridging wires.

However, the intraphase and interphase bridging wires may be alternatively made up of portions of the electric wires 50 without employing busbars. More specifically, as illustrated in FIG. 16B, either of the electric wires 50a and 50b may be extended so as to be directly joined to the other; the extended portion can be regarded as the bridging wire which electrically connects the two electric wires 50a and 50b. With this modification, it is possible to reduce the number of joints formed in the stator coil 40, thereby improving the productivity and lowering the manufacturing cost.

In addition, it is also possible to extend each of the electric wires 50a and 50b so as to directly join them. In this case, the extended portions of the electric wires 50a and 50b can be regarded as together making up the bridging wire which electrically connects the two electric wires 50a and 50b. With this modification, it is possible to suitably change the joining position between the electric wires 50a and 50b.

In the previous embodiments, the electrical connection between the winding segments of the phase windings, the intraphase bridging wires and the interphase bridging wires is made by welding. However, the electrical connection may also be made by other conventional methods, such as soldering.

What is claimed is:

1. A rotating electric machine comprising:
a rotor;
a stator including an annular stator core and a three-phase stator coil, the stator core being disposed in radial opposition to the rotor and having a plurality of slots arranged in a circumferential direction of the stator core, the stator coil being comprised of a plurality of phase windings star-connected to one another, the phase windings being partially received in the slots of the stator core so that parts of the phase windings are located outside the slots to make up a pair of coil ends of the stator coil, the coil ends protruding respectively from an opposite pair of axial end faces of the stator core,
wherein
each of the phase windings of the stator coil is comprised of a plurality of winding segments,
the stator coil further has a plurality of intraphase bridging wires electrically connecting the winding segments of the same phase and a plurality of interphase bridging wires electrically connecting neutral point-side ends of the phase windings, and
all of the intraphase and interphase bridging wires are arranged on one of the coil ends of the stator coil so that at least one of the intraphase bridging wires is in direst contact with at least one of the interphase bridging wires,
wherein at least one of the intraphase bridging wires electrically connects a pair of ends of the winding segments of the same phase to each other, one of the pair of ends being led out from a radially outer periphery of the coil end of the stator coil and the other end being led out from a radially inner periphery of the coil end.

2. The rotating electric machine as set forth in claim 1, wherein each of the intraphase bridging wires is in either direct or indirect contact with at least one of the interphase bridging wires.

3. A rotating electric machine comprising:
a rotor;
a stator including an annular stator core and a three-phase stator coil, the stator core being disposed in radial opposition to the rotor and having a plurality of slots arranged in a circumferential direction of the stator core, the stator coil being comprised of a plurality of phase windings star-connected to one another, the phase windings being partially received in the slots of the stator core so that parts of the phase windings are located outside the slots to make up a pair of coil ends of the stator coil, the coil ends protruding respectively from an opposite pair of axial end faces of the stator core,
wherein
each of the phase windings of the stator coil is comprised of a plurality of winding segments,
the stator coil further has a plurality of intraphase bridging wires electrically connecting the winding segments of the same phase and a plurality of interphase bridging wires electrically connecting neutral point-side ends of the phase windings, and
all of the intraphase and interphase bridging wires are arranged on one of the coil ends of the stator coil so that at least one of the intraphase bridging wires is in direst contact with at least one of the interphase bridging wires,
the rotating electric machine further comprises a cooling liquid supplier that supplies cooling liquid to at least one of the intraphase and interphase bridging wires,
the rotor has n magnetic poles formed therein and each phase of the stator coil is made up of p winding segments, where n is an even number greater than or equal to 2 and p is a natural number greater than or equal to 2,
when viewed along a longitudinal axis of the stator core, all of the intraphase and interphase bridging wires are arranged within an angular range θ, and $$\theta \geq p \times 360/n [\text{rad}].$$

4. The rotating electric machine as set forth in claim 3, wherein n=8, p=4, and θ≥180°.

5. The rotating electric machine as set forth in claim 3, wherein n=12, p=4, and θ≥120°.

6. The rotating electric machine as set forth in claim 3, wherein each of the intraphase bridging wires is in either direct or indirect contact with at least one of the interphase bridging wires.

* * * * *